United States Patent [19]
Welsh

[11] Patent Number: 4,857,999
[45] Date of Patent: Aug. 15, 1989

[54] VIDEO MONITORING SYSTEM

[75] Inventor: Russell J. Welsh, Toronto, Canada

[73] Assignee: PEAC Media Research, Inc., Toronto, Canada

[21] Appl. No.: 287,452

[22] Filed: Dec. 20, 1988

[51] Int. Cl.$^4$ .......................................... H04N 7/087
[52] U.S. Cl. .......................................... 358/84; 455/2
[58] Field of Search ............... 358/84, 142, 147, 139; 455/2

[56] References Cited

U.S. PATENT DOCUMENTS

| | | | |
|---|---|---|---|
| 3,845,391 | 10/1974 | Crosby | 455/2 |
| 4,025,851 | 5/1977 | Haselwood et al. | 358/84 |
| 4,058,829 | 11/1977 | Thompson | 358/84 |
| 4,163,254 | 7/1979 | Block et al. | 358/84 |
| 4,216,497 | 8/1980 | Ishman et al. | 358/84 |
| 4,230,990 | 10/1980 | Lert, Jr. et al. | 358/84 |
| 4,331,973 | 5/1982 | Eskin et al. | 358/84 |
| 4,420,769 | 12/1983 | Novak | 358/139 |
| 4,450,531 | 5/1984 | Kenyon et al. | 358/84 |
| 4,536,791 | 8/1985 | Campbell et al. | 358/84 |
| 4,573,072 | 2/1986 | Freeman | 358/86 |
| 4,635,109 | 1/1987 | Comeau | 358/84 |
| 4,639,779 | 1/1987 | Greenberg | 358/84 |
| 4,677,466 | 6/1987 | Lert, Jr. et al. | 358/84 |
| 4,697,209 | 9/1987 | Kiewit et al. | 358/84 |
| 4,720,873 | 1/1988 | Goodman et al. | 455/2 |
| 4,805,020 | 2/1989 | Greenberg | 358/84 |

Primary Examiner—Howard W. Britton
Attorney, Agent, or Firm—Faegre & Benson

[57] ABSTRACT

A video monitoring system for identifying television broadcast program material such as commercials by extracting characters present in the closed captioned portion of the video signal at line 21, field 1 and comparing the extracted characters to stored characters and recording the occurrence of a match between the extracted characters and the stored characters indicating the presence of specific program material such as a commercial in the broadcast signal. In an alternative embodiment, comparison may be made between a compressed character string formed from extracted characters and a stored compressed character string.

27 Claims, 8 Drawing Sheets

VIDEO MONITORING SYSTEM

BACKGROUND OF THE INVENTION

This invention relates generally to an improved method and apparatus for identifying television broadcast programs. This invention is particularly useful to identify repetitively broadcast television program material, such as commercials.

DESCRIPTION OF THE PRIOR ART

Large sums of money are spent annually to purchase advertising time on broadcast television. This has created a need to monitor and report on the broadcast of television programs in general and television commercials in particular. There are a number of known systems for identifying and verifying the broadcast of television commercials. These systems can be broadly characterized as being either manual or electronic.

Manual systems use human operators to view videotaped television broadcast signals, and to manually recognize each commercial or other specific program material to be found (for example, a public service message) and then to identify it by some coding structure. The codes generated can then be entered into a manual or computerized system where the data can be analyzed and reports can be produced. Even such computerized systems are labor intensive and therefore expensive to operate. The dependence on the human operators to recognize and reliably identify each commercial introduces a source of error into the collected data. Different operators will have varying abilities to recognize and identify individual commercials. Therefore it is more desirable to use an electronic system to monitor commercial broadcasts.

Electronic systems that have been proposed fall into two categories. The first category is one which requires an identification signal to be inserted into the broadcast material. U.S. Pat. No. 3,845,391 discloses a system in which a code is modulated onto an audio frequency sub-carrier. U.S. Pat. Nos. 4,025,851 and 4,639,779 disclose systems in which a code is modulated onto a line in the vertical interval of the television video broadcast signal. These systems require the cooperation and participation of the broadcaster who may not be interested in supporting a system that monitors commercial broadcasts. These systems also require an allocation of some signal bandwidth in the television broadcast signal. The broadcasters would prefer to use this bandwidth for revenue generation and the FCC has not reserved and not protected any bandwidth for the purpose of program identification.

Another type of electronic system analyses the program content of the broadcast signal to identify the commercial. U.S. Pat. Nos. 4,450,531 (Kenyon) and 4,230,990 (Lert) describe such systems. These systems use different techniques to analyze the video and audio content of the signal to extract features which are then compared to a database containing features previously extracted from known commercials. This could broadly be defined as a pattern recognition and pattern matching process. These systems require that large amounts of information be processed to generate these extracted features. Kenyon describes a technique requiring continuous Fourier transformation of the broadcast signal being monitored. Lert describes a system that reduces the amount of signal that must be processed by triggering the analysis on cues that are normally present in the broadcast signal or cues that are inserted in the broadcast signal. These systems require powerful signal processors to generate the extracted patterns and large databases of patterns to compare them with. These systems require good received signal quality since noise in the signal can affect the features that are extracted.

SUMMARY OF THE INVENTION

One object of the present invention is to provide a novel automatic method and apparatus for identifying broadcast television program material (including commercials) that overcomes the disadvantages of the prior art systems.

Another object of the present invention is to provide an automatic method and system for identifying broadcast television program material that requires simpler and less expensive processing equipment.

Another object of the present invention is to provide an automatic method and system for identifying broadcast television program material that does not require the insertion of special identification signals or codes into the broadcast signals.

Another object of the present invention is to provide an automatic method and system for identifying broadcast television program material that uses signals that are normally present in the broadcast television signal and that are protected by the rules of the FCC (Federal Communications Commission) and the Canadian DOC (Department of Communications).

These and other objects are achieved by using the closed captioning for the deaf signal that is included in line 21 of the NTSC video signal. The closed captioning signal is specified and defined in Report No. E-7709-C, Revised May 1980, by the Public Broadcasting Service which is hereby expressly incorporated by reference herein. The FCC Rules and Regulations covering the closed captioning data are specified in Part 73, Subpart E, section 43.682. The normal purpose of the closed captioning signal is to provide a visual depiction of the information simultaneously being presented on the aural subchannel of the television signal. A closed caption decoder processes this signal and produces titling as an overlay on the television picture, the content of such titling being the dialog that is occurring on the audio of the television program. This signal was originally provided as an aid to the hearing impaired and it is now also often used as an aid to improve literacy skills.

The closed captioning signal can be decoded to produce a sequence of alphanumeric characters that form words and sentences. The content of these sentences is unique to the dialog that is occurring in the audio of the television program. The closed captioning data rate is 480 bits per second which is formatted as 60 characters per second (8 bits per character).

Briefly, in accordance with a preferred embodiment of the invention, there is provided a system having a station monitoring unit that monitors one or more broadcast sources. The station monitoring unit includes one or more television tuners which receive the television broadcast signals. The output of each tuner is fed through circuitry which extracts line 21 of field 1 of the television signal. Line 21 is processed by a decoder which extracts the two characters contained therein. These characters are then input to a computer system which can construct partial or complete message packets of the closed captioning information.

In the practice of this invention, the computer system preferably contains a library of captions for each of the programs that the system has been trained to recognize. Each message packet received can be compared against the caption library. If a match with the caption library exists, then the system will have identified the program or commercial and an entry can be made in a data log. The data entered in the log will preferably include an identification number of the commercial, the station on which it was broadcast and the date and time at which it was broadcast.

BRIEF DESCRIPTION OF THE DRAWINGS

FIG. 4b is the continuation of FIG. 4a.

DETAILED DESCRIPTION

Figure 1:
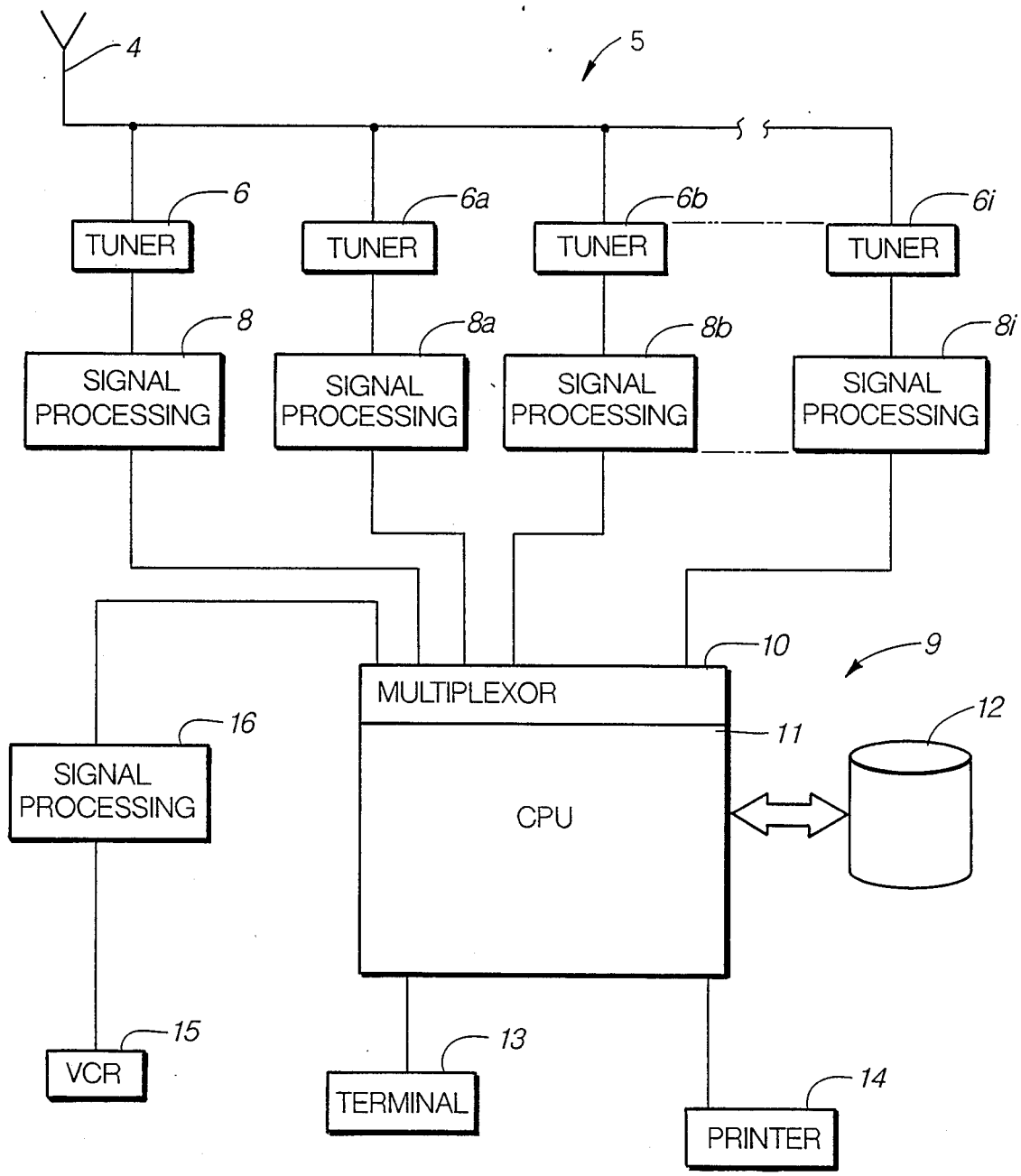
FIG. 1 is a block diagram of the system.

FIG. 1 shows a block diagram of the system 5. The received signal source 4 can be either an antenna or a cable television feed. The source is directed to a television tuner 6 which tunes the broadcast station of interest. The output of the tuner is the composite video signal which is directed to a signal processing circuit or module 8. The function of the signal processing module 8 is to extract the 8-bit characters that comprise the closed captioning information. Additional television tuners 6a–6i and signal processing modules 8a–8i are required for each additional broadcast station that is to be monitored. The characters extracted by the signal processing modules are routed to a computer system 9 via a multiplexer 10. The purpose of the multiplexer 10 is to allow a CPU 11 of system 9 to select the individual characters output from each signal processing module 8. When a signal processing module receives a character, it generates a signal to the CPU 11. Under control of the CPU 11, the multiplexer 10 selects the appropriate signal processing module 8 and the character is transferred to the CPU 11.

The computer system 9 shown in FIG. 1 can be one of a number of commercially available systems. One such possible system is a Compaq 386/20 which includes a CPU 11 and would preferably further include 3 megabytes of memory, a 130 megabyte disc drive 12, a keyboard and display terminal 13 and a printer 14.

Figure 2A:
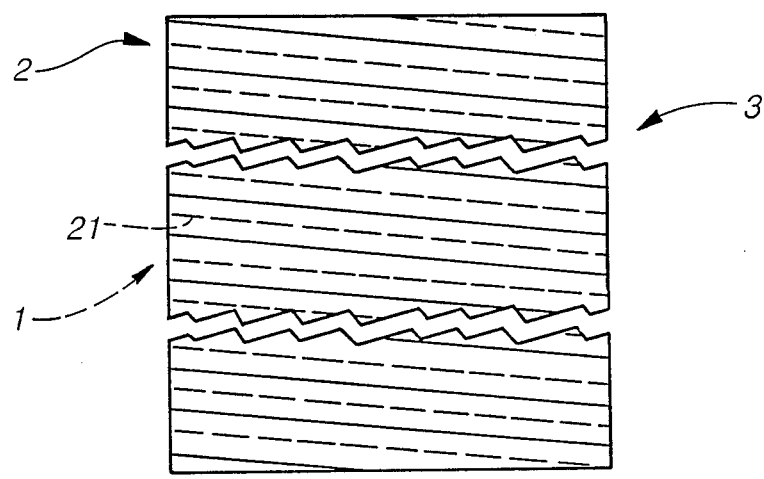
FIG. 2a is a diagram showing a view of fields 1, 2 of frame 3.
Figure 2B:
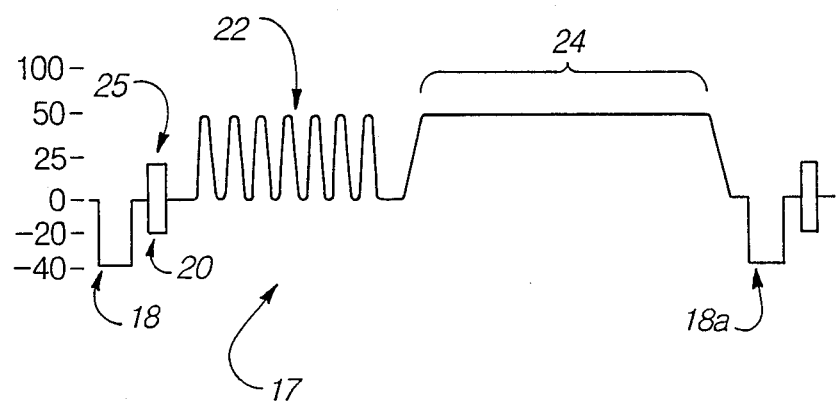
FIG. 2b shows the waveform of line 21, field 1 of the NTSC television signal.

Before proceeding with the system description, some background on the closed captioning signal is required. The reader is directed to the referenced PBS Report No. E-7709-C for a complete specification of the closed captioning signal. The NTSC television signal is comprised of 30 picture frames per second with 525 scan lines per frame. Referring now to FIG. 2a, first and second fields 1, 2 of a frame 3 may be seen. Scan line 21 in field 1 of frame 3 is reserved for the closed captioning signal as described in the FCC Rules and Regulations Title 47, Part 73, Section 682. The waveform of this signal 17 is shown in FIG. 2b as depicted in the FCC Rules and Regulations Title 47, Part 73, Section 699 which is hereby expressly incorporated by reference herein. As depicted in FIG. 2b, line 21 consists of a horizontal sync pulse 18, followed by the color burst 20, followed by 7 cycles of clock run-in 22 and then a two-character wide data window 24 for closed captioning information. Data may be transmitted in the window as a pair of characters every 33.3 milliseconds. The maximum data rate is 60 characters per second.

The purpose of the signal processing module 8 is to process the composite video signal and extract the data in the window 24 which may include up to two characters of closed captioning information from each occurrence of line 21. This module contains two sections—the first extracts line 21 signal or waveform 17 from field 1 of each frame 3 of the composite video signal and the second extracts character data from each occurrence of line 21 if characters are present in data window 24.

Figure 3A:
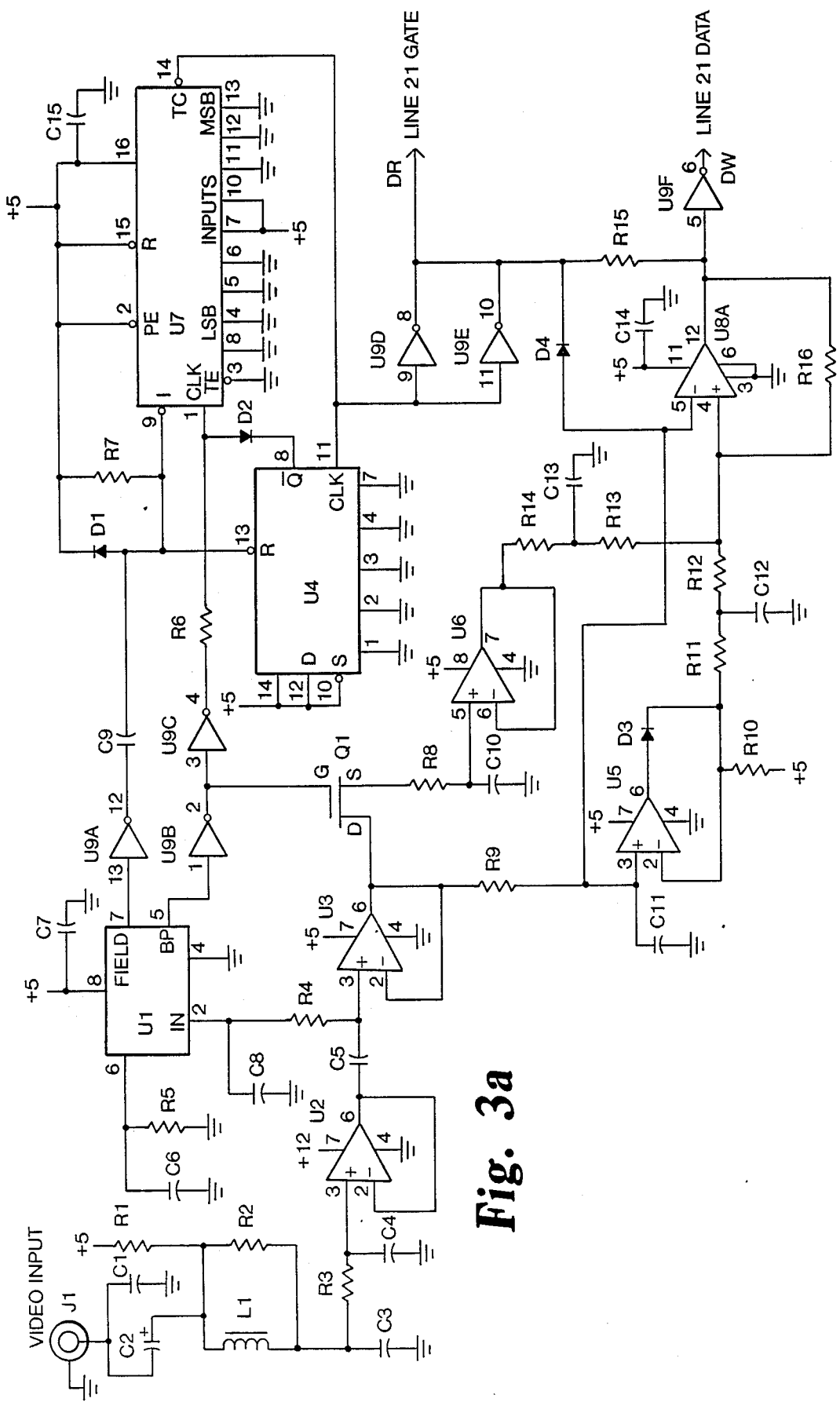
FIGS. 3a and 3b comprise a circuit diagram for the signal processing module shown as a block in FIG. 1.
Figure 3B:
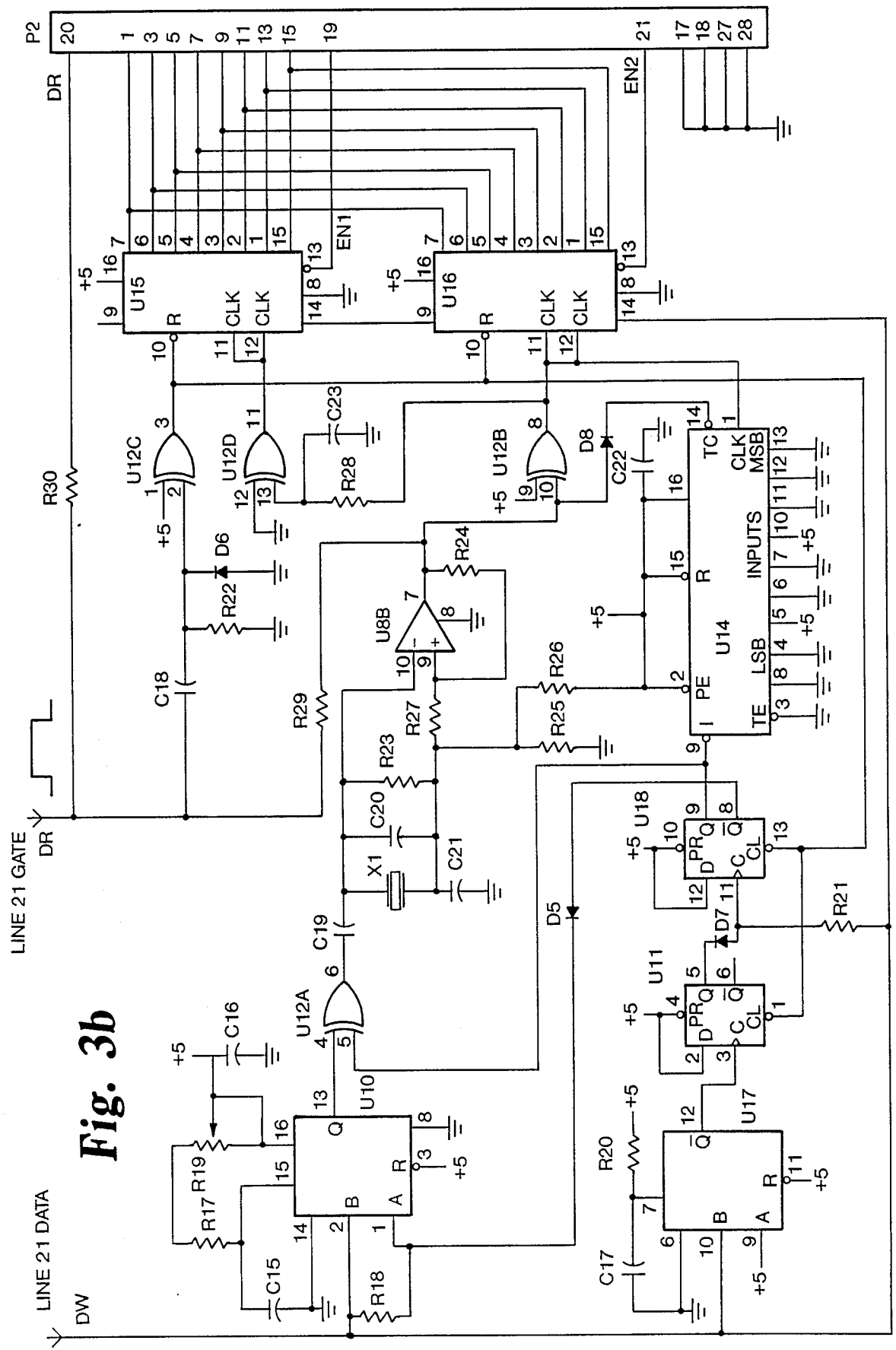

The circuitry of the signal processing module 8 is shown in FIGS. 3a and 3b. FIG. 3a shows the circuit that extracts signal 17 from line 21, field 1 of frame 3 and FIG. 3b shows the circuit that extracts characters from data window 24 of signal 17.

The function of the circuitry shown in FIG. 3a is to process the composite NTSC television signal, separate the line 21 signal 17 from the complete NTSC signal and convert it into two digital signals, DR and DW. Signal DR is a line 21 gate signal and signal DW is a line 21 data signal.

The video is input at the connector J1. The video signal passes across a 1.8 nf capacitor C1 and through a 22 uF capacitor C2 to a 45 microhenry inductor L1 in a resistive ladder network having a 100K resistor R1 and a 1K resistor R2. The signal is then passed across a 3.3 nF capacitor C3 and through a 1K resistor R3 to a 100 pF capacitor C4 and into the non-inverting input pin 3 of a type SE5534 operational amplifier U2, available from Signetics. Amplifier U2 is connected in a unity gain non-inverting configuration having an output at pin 6 feeding a 0.1 uF capacitor C5 which passes the AC component of this signal to the non-inverting input of another type SE5534 operational amplifier U3, also connected as a unity gain non-inverting follower. Output pin 6 of U3 is connected to the drain D of a 2N7000 FET transistor Q1. The signal at pin 3 of U3 is also connected through a 470 ohm resistor R4, across a 1.8 nF capacitor C8 and into pin 2 of an LM1881 type integrated circuit, available from National Semiconductor. U1 is used as a sync separator to identify the start of a new field. U1 has field index and back porch gate outputs at pins 7 and 5, respectively. U1 further has a 0.1 uF capacitor C6 and a 470K resistor R5 connected to pin 6. U1 still further has a 0.1 uF noise suppression capacitor C7 connected to its power supply input pin 8. The FIELD output of U1 at pin 7 is connected to a digital logic inverter U9A, which is preferably formed from a type 74HC04 hex inverter. The output of inverter U9A is passed through a 330 pF capacitor C9 to input pin 9 of U7, which is a HC40103 type integrated circuit counter available from Signetics. Diode D1, along with all other diodes in FIGS. 3a and 3b may be a 1N4148 type. Output pin 5 from U1 is connected to the input of another inverter U9B. Output pin 2 of inverter U9B is connected to the gate G of Q1 and input pin 3 of inverter U9C. Output pin 4 of inverter U9C is connected through a 2K2 resistor R6 to the clock input pin 1 of U7 and through a diode D2 to the not Q output pin 8 of U4. U4 is preferably a type HC74 integrated circuit available from Signetics. A 3K3 resistor R7 is connected from the power supply to the input pin 9 of U7.

The source S of Q1 is connected through a 1K resistor R8 to the non-inverting input pin 5 of a type LM358 integrated circuit operational amplifier, available from National Semiconductor. A 0.1 uF capacitor C10 is connected between the non-inverting input pin 5 and circuit common. The output pin 7 of U6 is connected through a resistive network of a 470 ohm resistor R14 and a 12K resistor R13 shunted by a 0.1 uF capacitor C13 and passing to the non-inverting input pin 4 of U8A, which is preferably a type LM319 voltage comparator. Output pin 6 of U3 is also connected through a 1K resistor R9 and across a 100 pF capacitor C11 to the non-inverting input pin 3 of U5, which is preferably a LM6361 type operational amplifier. The output pin 6 of U5 is connected through a diode D3 through a resistive network of a 150K resistor R10, a 51 ohm resistor R11, and a 10K resistor R12, connected to the non-inverting input pin 4 of U8A. A 1.8 nF capacitor C12 is connected between resistors R11 and R12.

Positive feedback for U8A is provided by a 560K ohm resistor R16, while diode D4 and a 470 ohm resistor R15 are connected in the output pull-up path of U8A. A pair of inverters U9D and U9E formed from the hex inverter U9 are connected in parallel to drive output DR from the TC output of U7 at pin 14. The output of U8A is connected to a digital logic inverter U9F to provide output signal DW. U1 can accurately identify the start of a new field and has field index and back porch gate outputs. Signal DW is a bit stream of the clock run-in pulses 22 and the data bits in window 24. Signal DR is active (high) only when line 21 in field 1 is being processed.

The operation of this portion of the circuit is as follows. Signal DR is normally low and goes high only when NTSC line 21 is present. Signal DW goes active only during NTSC line 21. Line 21 is identified by U1, U4 and U7. U1 accepts the composite video signal as input on pin 2 and produces output signals at pins 7 and 5. The FIELD signal at pin 7 of U1 is high (+5 volts) when NTSC field 1 is being received and low (0 volts) when NTSC field 2 is being received. The BP signal from pin 5 of U1 is a 4.8 usec pulse that occurs in the middle of the back porch 25 following the horizontal sync pulse 18. Counter U7 is initialized by the FIELD signal at the beginning of field 1 and is counted down by the pulses from BP. When line 21 is reached, pin 14 on U7 goes low for one scan line, thus creating the line 21 gate signal DR. The next pulse on BP causes pin 14 on U7 to return to the high state which sets the flip flop U4 and terminates counting by U7 until the next frame. The signal pulse BP is also used to sample the video signal to create a black reference level. When BP is active, it turns on Q1, allowing the black level of the back porch 25 to be sampled and stored on capacitor C10. The peak value of the video of line 21 is stored on capacitor C12. The voltage difference between the voltages stored on C10 and C12 is divided by the resistors R13 and R12 to create a reference level that is about half way between the two levels. This reference level is applied to pin 4 of U8A and the composite video signal is applied to pin 5 of U8A. U8A is a high speed comparator which, as a result of comparing the composite video signal to the reference level will provide a digital logic signal at pin 12. This signal is inverted by U9F to produce signal DW. Signal DW is normally clamped high, but during line 21 when DR goes high, signal DW is released and carries a digital logic waveform consisting of a digital representation of clock run in pulses 22 and data bits of window 24 in line 21.

Referring now to FIG. 3b, signals DW and DR are processed to extract two characters for each occurrence of line 21, field 1, containing closed captioned characters. Signal DW is delivered to the B input of each of U10 and U17, which are preferably a one shot or monostable multivibrator circuit type HC123, available from Signetics. U10 has a 3K3 resistor R18, a 330 pF capacitor C15, a 3K3 resistor R17 and a 5K potentiometer R19 (used to set the width of the pulse on pin 13 of U10), in addition to a 0.1 uF capacitor C16. U17 has a 4K resistor R20 and a 1nF capacitor C17. U11 and U18 are preferably formed of a 74HC74 D-type flip flop available from Signetics. Diode D7 is connected to the DW signal line through a 3K3 resistor R21. Diode D5 is connected between pin 1 of U10 and pin 8 of U18. Gate U12A is preferably formed of a 74HC86 type integrated circuit available from Signetics and couples the Q output at pin 13 of U10 through a 33 pF capacitor C19 to a 503.5 kilohertz resonator X1 which may be a model 503B as manufactured by Murata. Resonator X1 connects to a 0.1 uF capacitor C21 and a network formed of a 220 pF capacitor C20, a 100K resistor R23, a 1K resistor R27 and 10K resistors R25 and R26 to provide a cleaned-up clock signal from pin 13 of U10 to both inputs of U8B, which is preferably a type LM319 voltage comparator with a 100K positive feedback resistor R24.

The DR signal passes through a 1K resistor R29 and enables the output of U8B at pin 7 and fed to one input of U12B which is an inverter formed of a 74HC86 integrated circuit. U14 is preferably a type HC40103 integrated circuit counter available from Signetics, and connected to operate as a divide-by-16 counter. Counter U14 has a 0.1 uF capacitor C22. Diode D8 couples the TC output from U14 pin 14 to pin 10 of U12B. The output of U12B at pin 8 is connected to the CLK inputs of U16, which is preferably a type HC595N 8-bit shift register, available from Texas Instruments.

Signal DR is also coupled through a 330 pF capacitor C18, to diode D6 and into an input of U12C. The output of U12C at pin 3 is connected to the R input (the reset input) at pin 10 of U15 and U16 which are both a type HC595N 8-bit shift registers. Signal DR is provided to connector P2 through a 470 ohm resistor R30. The outputs of U15 and U16 are connected to connector P2. Output enable signal lines EN1 and EN2 are similarly connected to connector P2.

The function of the circuitry shown in FIG. 3b is to process the signals DW and DR to load the serial bits of the two characters into a register which can be accessed by a parallel read operation. Signal DW is active only during NTSC line 21. When it is active it is a digital logic waveform consisting of the 7 cycles of the clock run-in followed by one start bit and two 8 bit data characters. The rising edges of the clock run-in pulses trigger two one shots U10 and U17. The function of the one shot circuit U10 is to derive a normalized clock signal. The normalized clock signal from pin 13 on U10 is used to energize the resonator X1 which is tuned to the clock run-in signal frequency of 503.5 KHz. The resonator X1 signal is squared up by the comparator U8B. Referring also to FIG. 2, the period of the clock run-in signal is 1.98 usec per cycle and the seven cycles are followed by 3.972 usec of low signal level. The one shot formed by U17 is retriggerable and times out after the end of the clock run-in pulses 22, resulting in the setting of the flip flop U11. Setting U11 unclamps the clock input on U18. The next data rising edge will be the start bit which will then set flip flop U18. U18 then releases the counter U14 and the shift registers U15 and U16. The counter U14 is initialized with a value of 16 and is driven by the clock from the resonator X1. The 16 data bits are subsequently clocked into the shift registers. When the counter hits zero, the signal on pin 14 of U14 goes low which terminates the clock signal to the shift registers U15, U16. After NTSC line 21, signal DR goes low. Signal DR and the contents of the shift registers U15 and U16 are available to multiplexer 10 at connector P2. A high-to-low transition of DR can be used an indication that the data is available in the shift registers U15, U16.

Figures 4, 4A:
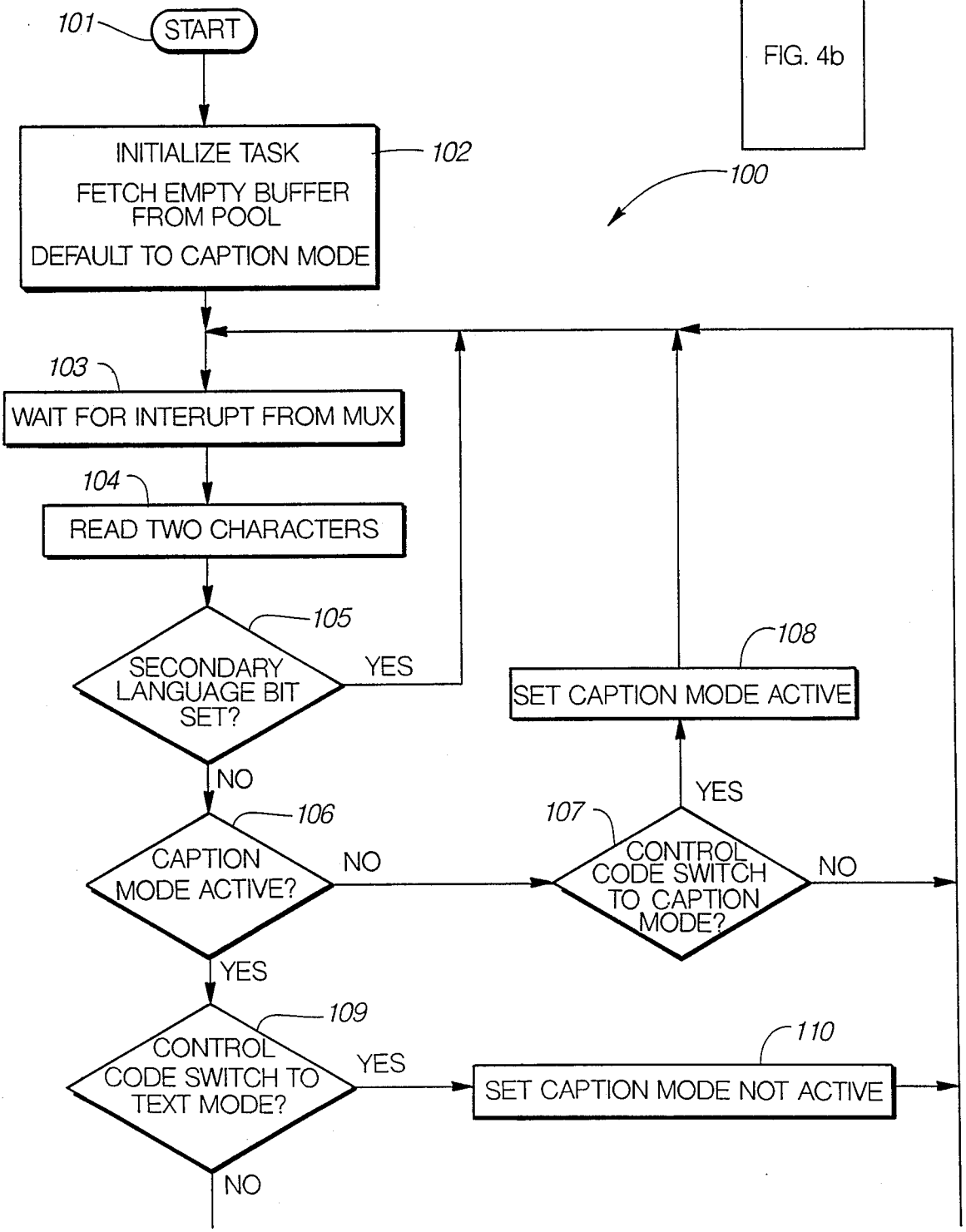
FIG. 4 is a key diagram for FIGS. 4a and 4b.
FIG. 4a is a partial flow chart for the software that assembles a paragraph of closed captioning data.
Figure 4B:
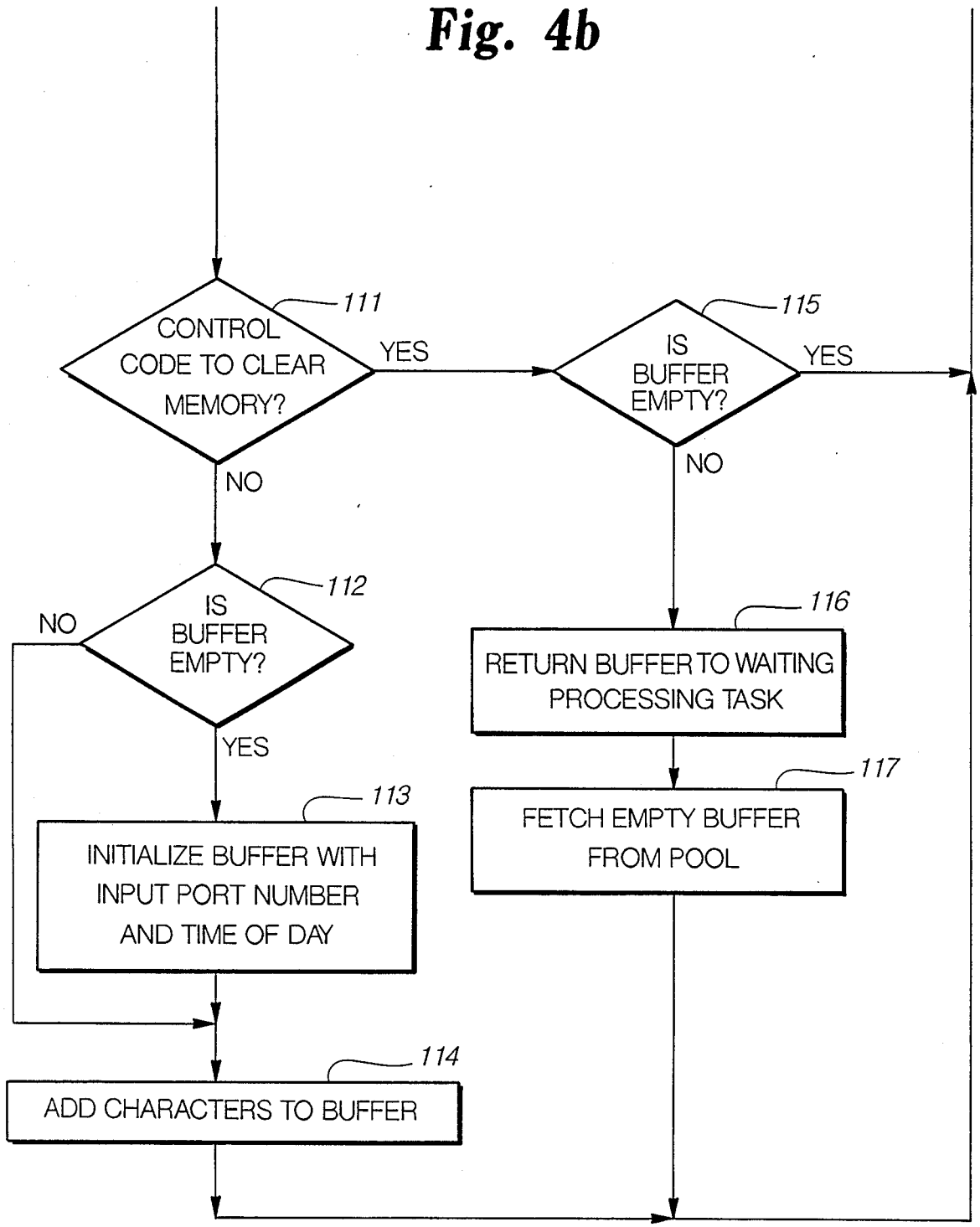
Figure 5:
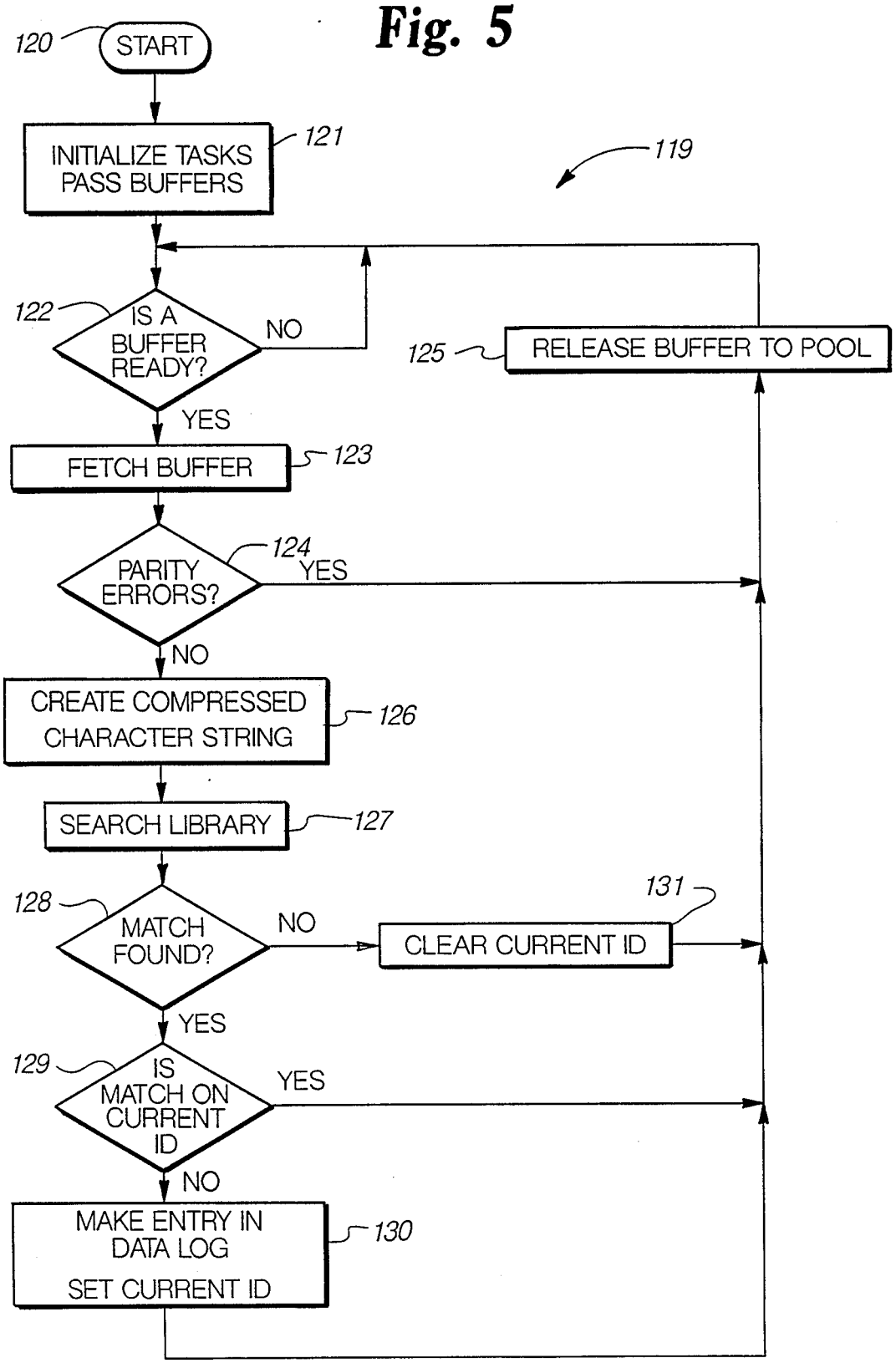
FIG. 5 is a flow chart for the software that seeks a match for a paragraph of received caption data in the caption library.
Figure 6:
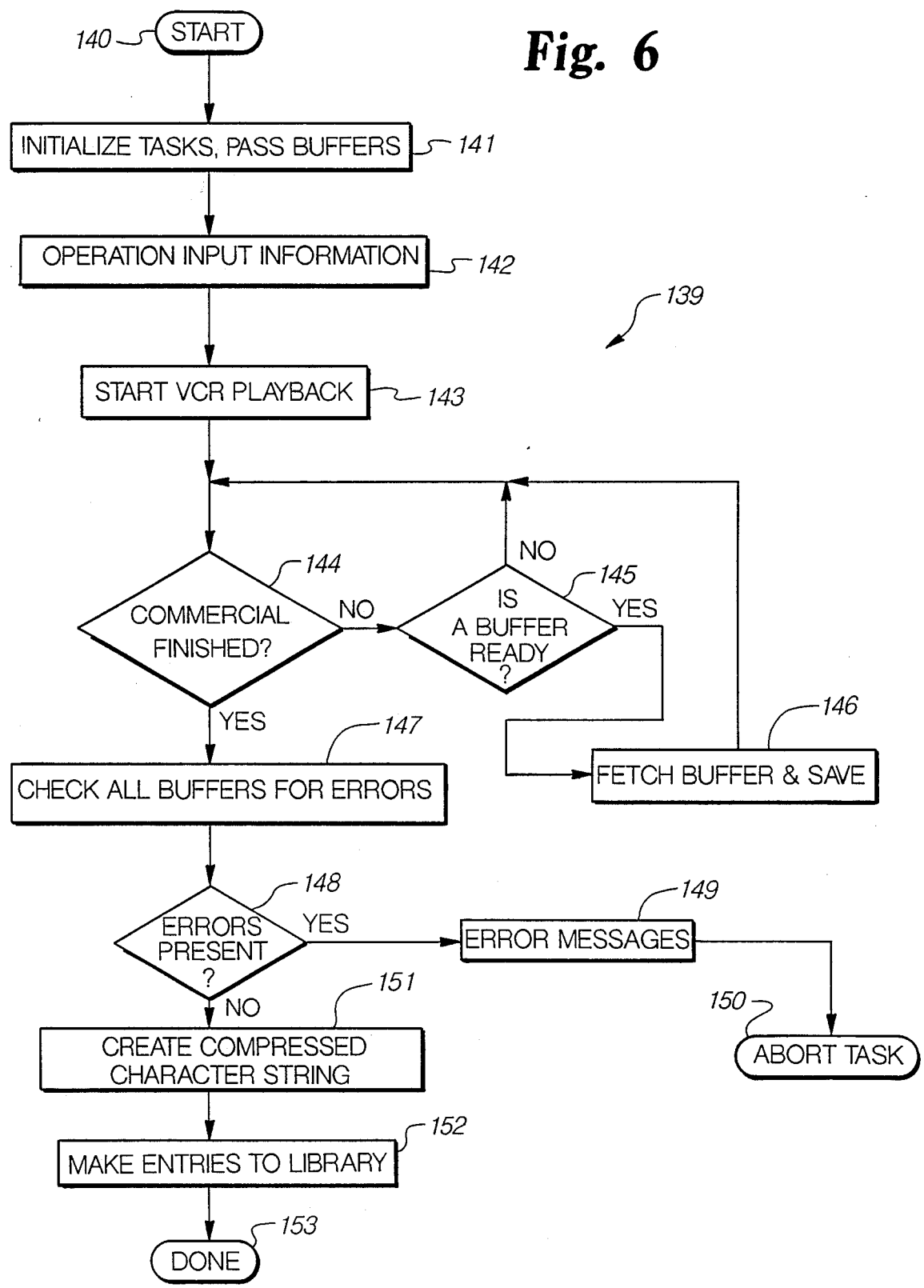
FIG. 6 is a flow chart for the steps required to make an entry to the caption library.

The multiplexer 10 shown in FIG. 1 may be a parallel interface board such as the model PIO-96W available from Contec Microelectronics Inc. The Contec PIO-96W interface board has eight 12 bit input/output ports. Each port can be interfaced to one signal processing module 8 or 16. The data can be read from the shift registers U15 and U16, one 8 bit character at a time by controlling the chip enable signal lines EN1 and EN2 connected respectively to pin 13 of U15 and U16 as shown in FIG. 3b. The falling edge of the signal DR can be used to generate an interrupt on each port of the interface board. On each occurrence of an interrupt, computer 9 reads the characters from the shift registers U15, U16 associated with the interrupt-generating port and stores the characters as data in a buffer in the computer memory. Further processing of the data is controlled by software in the computer as shown in FIGS. 4-6.

It is to be understood that the closed captioning information channel supports a caption mode and a text mode in both a primary and a secondary language. The caption mode text is recorded on a video tape along with the commercial and is automatically broadcast when the tape is played. When present, the text mode is generated and transmitted by the broadcaster when the channel is not being used to carry caption mode data. The caption and text modes in both languages are time multiplexed into the one serial character channel. Control code characters are used to switch the character stream between caption mode and text mode and between the two languages.

Software in the computer must separate the caption mode characters from the remainder of the character stream. The characters in the closed captioning text are organized into phrases and sentences complete with punctuation and control codes. In caption mode, the control codes perform operations such as erasing the displayed captions, selecting the line on which the captions are to be displayed, setting colors for the characters, and controlling scrolling of the captions on the television set. For the purposes of this system, the caption text can be considered to be a series of paragraphs where a paragraph is the series of characters between two successive commands to clear the captions from the screen. The characters in a paragraph can be organized into phrases and sentences.

The command to erase displayed captions occurs relatively frequently; typically at any significant scene change. Every commercial begins and ends with a command to erase the displayed captions. Therefore, a commercial can include one or more paragraphs of caption text. Computer system 9 recognizes commercials by extracting the caption mode text from the continuing character stream, organizing this text into sensed paragraphs and then comparing each sensed paragraph to a library of stored paragraphs for the commercials that the system has been trained to recognize. Each stored paragraph in the library preferably has a corresponding commercial ID number.

In one embodiment, sensed paragraphs are compared directly to stored paragraphs. In an alternative embodiment, the caption mode paragraphs are compressed by a data compression. The data compression algorithm processes the variable length string of ASCII characters that comprise the paragraph and produces a shorter and preferably unique string or key of encoded bytes. A number of algorithms are known to those skilled in the art; a preferred data compression algorithm is Adaptive Lempel-Ziv Coding, which may be found in an article by Terry Welch entitled "A Technique For High Performance Data Compression," pp. 8–19 of Vol. 7, No. 6, of IEEE Computer, June 1984. One alternative algorithm or technique which may be used is Huffman Encoding, which may be found in an article by Jonathan Amsterdam entitled "Data Compression with Huffman Coding," pp. 99–108 of Vol. 11, No. 5 of BYTE Magazine, May, 1986. A still further alternative is to use hash coding to form a key for data "compression." While a hash code key is irreversible in the sense that the original data cannot be recovered from the key, reversibility is not necessary for the practice of this invention. It is theoretically most desirable to have a one-to-one and only one-to-one correspondence between the original data and the key resulting from operation of the data compression algorithm on the original data. In other words, it is preferable to have one and only one set of original data correspond to a given key. Nevertheless, it is to be understood to be within the spirit and scope of this invention to use an algorithm having a less than ideal data-key correspondence, which, for example, can provide savings in operating speed, storage requirements or other practical considerations that outweigh the risk of error in using such an "imperfect" data compression algorithm.

Returning to a preferred embodiment, both sensed and stored paragraphs are processed by a data compression using adaptive Lempel-Ziv Coding to produce a unique multi-byte key. These keys can be stored in the library instead of the complete paragraph itself. The library in this case would include the multi-byte keys, each with a corresponding commercial ID number. When the system is identifying commercials, the sensed paragraphs (derived from the broadcast sources) are each put through the same algorithm or transform to produce a key which is then compared to the keys in the library.

FIG. 4 is a flow chart for the software module that is used to perform the task of reading the characters into the computer and then forming the characters into paragraphs of caption mode text. This module is started by a higher level task and once started will continue to operate as an independent, interrupt driven task until cancelled by the task that initiated it. When the task is started at entry step 101 it acquires a pool of empty data buffers which are used to assemble the paragraphs and to transfer the completed paragraphs to the higher level task. When it is started, module 100 is also given the number of the port on the multiplexer 10 that it will access to read the characters. At step 102 the module 100 initializes itself and the multiplexer 10 hardware, fetches an empty data buffer (the "active" buffer) from the pool and defaults to a caption mode active condition. It then proceeds to step 103 where it enters a suspended condition, waiting for an interrupt from the multiplexer 10. When an interrupt occurs, the task proceeds to step 104 where it uses the multiplexer 10 to read the two characters from the signal processing module 8. At step 105, a test is made to determine if the secondary language bit is set; and if it is the characters are ignored and control returns to step 103 to wait for the next pair of characters. If the characters are in the primary language, the process proceeds to step 106 where a test is made to determine if the caption mode is active. If it is not active then the characters are text mode data that can be ignored and control is returned to step 103 to wait for the next two characters. However, the return to step 103 is made via step 107 where a test is made to determine if the characters received are the control characters that switch the character stream into caption mode. If this is true, then at step 108 the caption mode is set active. If the caption mode is active at step 106, step 109 then tests the received characters to determine if they are the control characters that switch the character stream into text mode, i.e., to set caption mode not active. If so, control again returns to step 103 after setting the caption mode not active at step 110. Control will proceed to step 111 only when caption mode characters are being received. Step 111 tests to determine if the characters received include the control codes to clear memory. If not, then these characters form part of the current paragraph and are added to the active buffer. However, before adding the characters to the active buffer, step 112 tests to determine if these characters are the first characters in this paragraph; and, if they are, at step 113 the active buffer is initialized with the number of the port on the multiplexer 10 from which these characters are read and the time of day at which the characters are received. At step 114, the characters received are added to the active buffer and control then returns to step 103 to wait for the next two characters. If the test at step 111 indicates that the control code to clear memory has been received then the contents of the active buffer represent a complete sensed paragraph. Before transferring the contents of the active buffer, i.e., the sensed paragraph, to the higher level task, a test is made at step 115 to determine if the active buffer is empty, since it is possible that the character stream may contain sequential clear commands and it is preferable to avoid transfer of empty active buffers to the higher level task. If the active buffer is not empty, then at step 116 the active buffer containing the paragraph just received is transferred to the higher level task.

FIG. 5 is a flow chart for the software algorithm or task 119 that is used to compare the sensed paragraphs to the library of stored paragraphs. Task 119 processes the data buffers that are filled by and transferred from the module or task 100. Task 119 processes the data buffers and releases them faster than task 100 can fill and transfer buffers to avoid build-up of a long data buffer queue. Task 119 correlates the number of the port being monitored on the multiplexer 10 to the television channel being tuned by the tuner 6-6i. Task 119 starts at step 120. At step 121, the task initializes itself, creates and passes a pool of data buffers to task 100, selects the port number to be monitored on the multiplexer 10, and then transfers control to task 100 at step 101. At step 122 it monitors the pool of data buffers until one is transferred from task 100. At step 123, the task 119 fetches the oldest available buffer in the queue. At step 124, the buffer is examined for communication errors (parity checks); and if errors have occurred, the buffer is returned to the pool at step 125 and control returns to step 122. At step 126, data compression transformation is performed on the paragraph in the buffer to create a corresponding key or compressed character string. At step 127, the library is searched for a matching key and, if a match is found, the commercial ID number is returned from the matching key file in the library. If there is no match, control returns through step 125 to step 122. If a match is found, one additional test must be made before making an entry in the data log. Each commercial may include more than one closed captioning paragraph but it is desirable that the system make only one entry in the data log for each play of the commercial. Therefore, at step 129 a test is made to determine if the match is for a commercial ID that is current. If the match is not on a current commercial, at step 130 an entry is made in the data log and the current ID is set for the commercial that was just identified. Then the buffer is released at step 125 and the task returns to step 122 where it waits for a buffer to be ready. The current ID is reset at step 130 after a new commercial has been identified and cleared at step 131 whenever a match is not made on a valid paragraph.

As stated previously, at step 130 after a match is found, data is entered into a data log. Preferably, the data that is collected includes an ID number for the commercial, the station on which the commercial was broadcast, and the time at which it was broadcast. Other information that may be collected or maintained in the data log or database is a title of the commercial, the length of the commercial, and the category and brand and the name f the manufacturer of the product being advertised. It is to be understood that once started, module 119 runs continuously until cancelled. Module 119 will continually process active buffers filled in module 100 and release empty buffers to the pool (for use by module 100). Although not shown, it is to be further understood that the data log created by module 119 is preferably periodically interrogated and cleared.

One other function that the system 5 performs is the creation and maintenance of the library of stored paragraphs, or data compression keys and commercial ID numbers. In FIG. 1, a VCR 15 is preferably located at or near terminal 13. The purpose of the VCR 15 is to generate (from video tape) the caption mode paragraphs for the commercials that the system is trained to recognize. The composite output of the VCR is directed to a signal processing module 16, the output of which is input to the computer system via the multiplexer 10. An operator enters the caption mode text for a commercial into the library by playing a taped copy of the commercial on the VCR while running a special program on the computer. This program is called the library input program.

The algorithm or task 139 for the library input program is shown in FIG. 6. Task 139 starts at step 140. At step 141 task 139 initializes itself and starts the low level task 100 which reads the characters and assembles the sensed paragraphs. This task must also maintain a pool of data buffers which are shared with the low level task 100. At step 142, the operator inputs (via the keyboard of terminal 13) the commercial ID number that is to be assigned to this commercial as well as any other information relevant to that commercial such as product category, manufacturer, agency, etc. At step 143, the operator starts VCR 15 to play the tape of a commercial to be "memorized" by computer 9. In the loop formed by steps 144, 145 and 146, task 139 accepts buffers until the tape is stopped. When the tape is stopped, the task 139 is allowed to proceed to step 147 where the paragraphs in the buffers are checked for communication errors (parity checks). If errors are detected, the task terminates at step 150 rejecting any library entry that is not perfect, preferably with a suitable error message for the operator. If there are no errors, at step 151 the task 139 performs the character string compression on each of the paragraphs. At step 152, an entry is made in the library for each of the compressed strings.

Other variation and improvements to the present invention are possible within the scope of the appended claims. While this description has been directed specifically at identifying television commercials, this system could be used for identifying any television broadcast programme. For example, one possible variation and improvement to the present invention might be to allow the system to tolerate a small percentage of transmission errors. In the described embodiment at step 124 of FIG. 5, sensed paragraphs are discarded if they contain any parity errors (caused by transmission errors). Alternatively, the system can be programmed to accept some percentage of parity errors. The match criteria in this case will not require an absolute match on a character by character basis but accept some small percentage of unmatched characters.

The invention is not to be taken as limited to all of the details thereof as modifications and variations thereof may be made without departing from the spirit or scope of the invention.

What is claimed is:

1. A method of monitoring broadcast television to detect specific program material comprising:
    (a) monitoring at least one television signal;
    (b) extracting a plurality of characters present in the closed captioned portion of the signal;
    (c) comparing the extracted plurality characters to a predetermined plurality of characters to determine if a match exists; and
    (d) recording each occurrence of a match between the extracted plurality of characters and the predetermined plurality of characters.

2. The method of claim 1 wherein step (a) further comprises monitoring a plurality of television signals.

3. The method of claim 1 wherein step (c) further comprises transforming the extracted plurality of characters in a data compression algorithm and comparing the result to a predetermined plurality of characters which have been processed by the same compression algorithm.

4. The method of claim 3 wherein the data compression algorithm comprises adaptive Lempel-Ziv coding.

5. The method of claim 1 wherein the predetermined plurality of characters comprises individual sets of predetermined pluralities of characters wherein each set corresponds to specific program material to be detected.

6. The method of claim 5 wherein step (d) further comprises recording identifying information for the specific program material detected.

7. The method of claim 5 wherein step (d) further comprises recording the channel on which the detected material was broadcast.

8. The method of claim 5 wherein step (d) further comprises recording the time at which the detected material was broadcast.

9. The method of claim 5 wherein step (d) further comprises recording the length of the detected material.

10. The method of claim 5 wherein the specific program material comprises a commercial.

11. A method of capturing data from a closed captioned portion of a television signal comprising:
    (a) reading characters from a data window portion of line 21, field 1 of a broadcast television signal;
    (b) checking to see if a caption mode is active;
    (c) storing the characters if the caption mode is active; and
    (d) repeating steps (a)–(c) until a control code to clear memory is read in step (a).

12. The method of claim 11 further comprising an additional step (a1) after step (a) of:
    (a1) checking to see if a secondary language bit is set and skipping steps (b) and (c) if it is.

13. The method of claim 11 wherein step (d) further comprises checking to see if any characters have been stored after a control code to clear memory is read.

14. A method of verifying the broadcast of television program material comprising:
    (a) forming a sensed paragraph of characters broadcast in successive data windows of the closed caption data portion of line 21, field 1 of a NTSC television signal;
    (b) comparing the sensed paragraph to a plurality of stored paragraphs of characters previously placed in a library of stored paragraphs; and
    (c) entering identifying information into a data log when a match is found between the sensed paragraph and one of the stored paragraphs where the identifying information entered is unique to the stored paragraph matching the sensed paragraph.

15. The method of claim 14 wherein the identifying information further comprises a station on which the material was broadcast.

16. The method of claim 15 wherein the identifying information further comprises a time at which the material was broadcast.

17. The method of claim 14 wherein the program material comprises a commercial.

18. The method of claim 17 wherein the identifying information further comprises a name of a sponsor of the commercial.

19. A method of verifying the broadcast of television program material comprising:
    (a) forming a sensed paragraph of characters broadcast in successive data windows of the closed caption data portion of line 21, field 1 of a NTSC television signal;
    (b) performing a character string compression transformation on the sensed paragraph to create a compressed string;
    (c) comparing the compressed string for the sensed paragraph to a plurality of stored compressed strings;
    (d) entering identifying information into a data log when a match is found between the compressed string for the sensed paragraph and one of the stored compressed strings where the identifying information entered is unique to the one stored compressed string matched.

20. The method of claim 19 further comprising an additional step (a1) after step (a) of
(a1) performing a parity check on the sensed paragraph and skipping steps (b)-(d) in the event parity errors are found.

21. The method of claim 19 further comprising an additional step (a1) after step (a) of:
(a1) performing a parity check on the sensed paragraph and skipping steps (b)-(d) in the event that more than predetermined number of parity errors are found.

22. The method of claim 19 wherein the character string compression transformation comprises adaptive Lempel-Ziv coding on the paragraph formed in substep (ii).

23. The method of claim 19 wherein the character string compression transformation comprises Huffman coding on the paragraph formed in substep (ii).

24. The method of claim 19 wherein the character string compression transformation comprises hash code encoding on the paragraph formed in substep (ii).

25. The method of claim 19 further comprising a step (a0) before step (a) of:
(a0) forming a stored compressed character string by:
   (i) operating a VCR in a playback mode to play a predetermined program segment having closed captioned data,
   (ii) forming a paragraph of characters corresponding to all characters between successive clear memory control codes,
   (iii) performing a character string compression transformation on the paragraph formed in substep (ii) to create a compressed character string uniquely corresponding to the paragraph transformed, and
   (iv) storing the compressed character string along with associated identifying information for the paragraph transformed.

26. The method of claim 22 wherein the predetermined program segment comprises a commercial.

27. The method of claim 23 wherein the identifying information comprises a serial number and a name of a sponsor for the commercial.

* * * * *

UNITED STATES PATENT AND TRADEMARK OFFICE
CERTIFICATE OF CORRECTION

PATENT NO. : 4,857,999

DATED : August 15, 1989

INVENTOR(S) : Russell J. Welsh

It is certified that error appears in the above-identified patent and that said Letters Patent is hereby corrected as shown below:

In Claim 26, Column 14, Line 18

Change "22" to --25--.

In Claim 27, Column 14, Line 20

Change "23" to --26--.

Signed and Sealed this

Twenty-ninth Day of May, 1990

Attest:

HARRY F. MANBECK, JR.

Attesting Officer

Commissioner of Patents and Trademarks